UNITED STATES PATENT OFFICE.

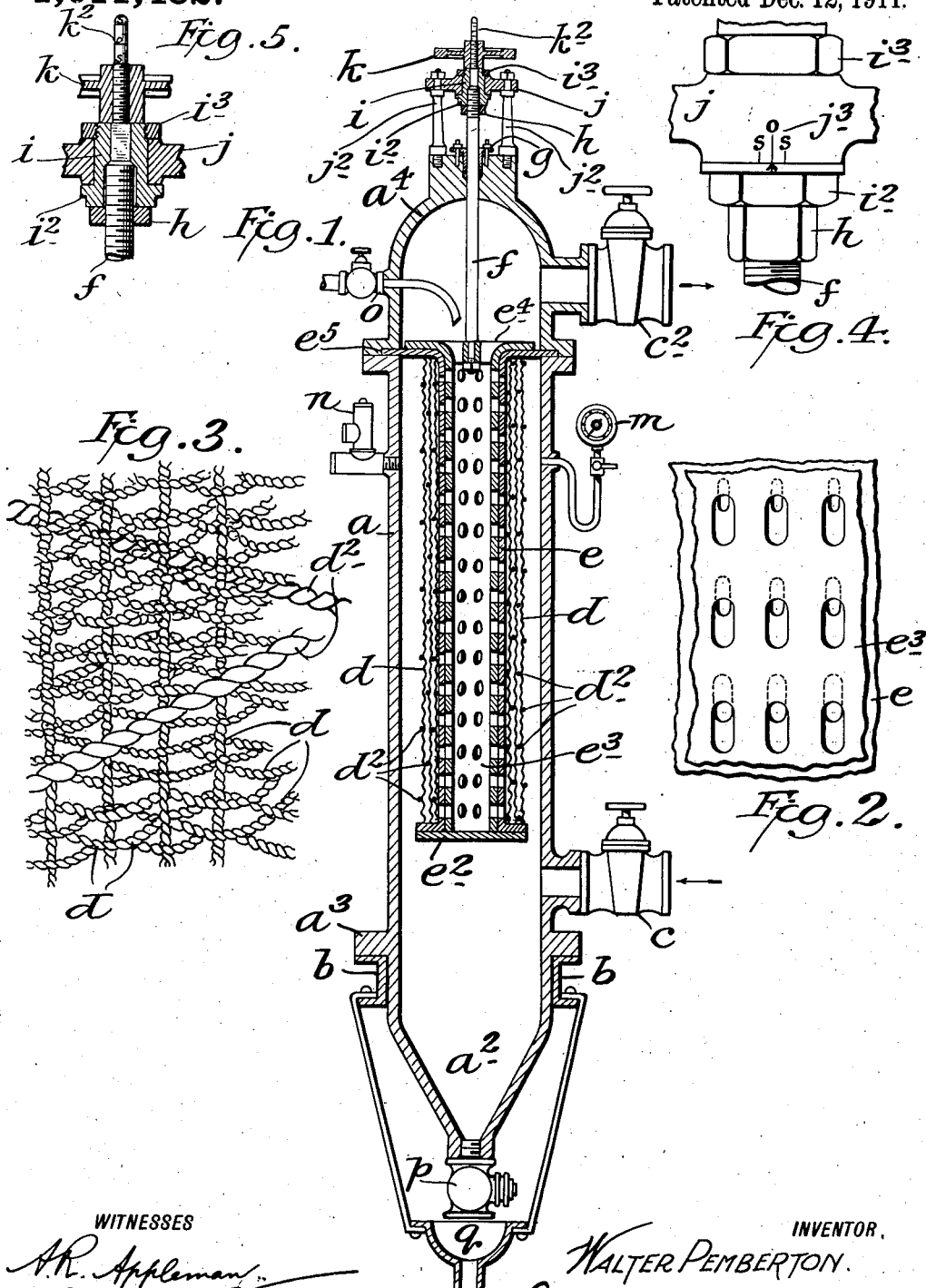

WALTER PEMBERTON, OF NEW MOSTON, NEAR MANCHESTER, ENGLAND.

APPARATUS FOR FILTERING AND EXTRACTING SUSPENDED MATTER FROM BOILER FEED-WATER UNDER PRESSURE.

1,011,482.  Specification of Letters Patent.  Patented Dec. 12, 1911.

Application filed June 15, 1911. Serial No. 633,338.

*To all whom it may concern:*

Be it known that I, WALTER PEMBERTON, engineer surveyor, holding first-class board of trade certificate, seagoing, being a citizen of the city of Manchester, England, and residing at 44 Belgrave road, New Moston, near Manchester, Lancashire, Great Britain, have invented certain new and useful Improvements in Apparatus for Filtering and Extracting Suspended Matter from Boiler Feed-Water Under Pressure, of which the following is a specification, such as will enable those skilled in the art to which it appertains to make and use the same.

This invention relates to apparatus for filtering and extracting suspended matter from boiler feed water, and the object thereof is to provide an improved device of this class which will effectually perform the above named operation; a further object being to provide means whereby the flow of water into the boiler through said device may be regulated as desired; and with these and other objects in view, the invention consists in a device of the class specified, constructed as hereinafter described and claimed.

The invention is fully disclosed in the following specification, of which the accompanying drawing forms a part, in which the separate parts of my improvement are designated by suitable reference characters in each of the views, and in which:

Figure 1 is a partial vertical section of my improved filtering apparatus; Fig. 2 a detail view showing two foraminated cylinders which I employ and showing the relation of the apertures of one cylinder to those of the other; Fig. 3 a detail view showing a filtering cartridge through which the water is strained or filtered in the operation of the apparatus; Fig. 4 a side view on an enlarged scale of a detail of the construction shown in Fig. 1, and; Fig. 5 a sectional view on an enlarged scale of a part of the construction shown in Fig. 1.

In Fig. 1 of the accompanying drawing I have shown at $a$ the main body portion of my improved filter, said body portion being preferably cylindrical in form and the bottom thereof being in the shape of an inverted cone, and said bottom being provided with a projecting flange $a^3$ by means of which the apparatus may be supported on girders as shown at $b$. The upper end of the body portion $a$ is provided with a dome-shaped head $a^4$ which contains the mechanism by which the filter controls the admission of feed water to the boiler, and the bottom portion of said filter is also provided with an inlet valve $c$, and the head $a^4$ with a discharge valve $c^2$. Mounted in the main body portion $a$ and suspended from the top thereof is a metallic cylinder $e$ having a plurality of apertures arranged circumferentially therein, said apertures being approximately elliptical in form and those apertures at the lower end of said cylinder being made larger in size than those at the upper end thereof, and said cylinder being closed at the bottom by means of a cap or other device $e^2$.

The filtering medium which I employ is preferably composed of three layers $d$ of fibrous material or fabric, such as cocoanut fiber, said filtering medium being made in the form of a cartridge and adapted to inclose said cylinder, the three layers thereof being held apart by means of spiral windings $d^2$ of roping interposed between said cartridge layers, as will be clearly seen in Fig. 3 of the drawing.

Mounted in and fitting snugly within the outer cylinder $e$ is an inner cylinder $e^3$ perforated in the same manner as the outer cylinder, except that the apertures are all made the same size. At the top of the said inner cylinder $e^3$ and preferably made integral therewith is an expanded spider head $e^4$ connected with which is a spindle $f$ which extends upwardly through a stuffing box $g$ formed in connection with the top of the dome or head $a^4$ of the filter body $a$, and as shown in the drawing the cylinder $e$ is suspended by means of an annular head $e^5$ formed integrally therewith and secured between the body $a$ of the filter and the dome $a^4$ thereof and on which the head $e^4$ of the cylinder $e^3$ rests. Mounted on and adjustable longitudinally of said spindle $f$ is a nut $h$ and above said nut $h$ is a bushing $i$ the lower portion of which is formed into a collar portion $i^2$ and the upper end of which is provided with a nut $i^3$, said bushing being supported in a cross head $j$ which in turn is supported on two uprights or pillars $j^2$ and the spindle $f$ is also provided above the nut $h$ with a handle wheel $k$.

At one side of the main body portion $a$ of the filter is a pressure gage $m$ and on the opposite side is a safety valve $n$ which is spring-operated and may be set to work at any desired pressure.

Connected with the bottom of the lower cone-shaped portion of the filter $a$ is a discharge valve $p$ which communicates with a receiving hopper $q$, and secured to one side of the head $a^4$ of said filter is a coupling $o$ extending into said head in the form of a downwardly directed jet through which steam may be forced in order to clean or flush out the filter and remove therefrom any deposits which may accumulate therein, and said deposits may be discharged from said filter through the valve $p$ into the hopper $q$, and the operation will be readily understood from the foregoing description when taken in connection with the accompanying drawing and the following statement thereof.

In the practice of my invention the filter is first connected with a water supply pipe from any suitable source of supply, said connection being made at the inlet valve $c$ in the lower portion of the body $a$ of the filter and the discharge pipe $c^2$ is connected with another pipe communicating with the boiler in connection with which said apparatus is to be used. Water is then admitted through said inlet valve $c$ to the lower part of the body $a$ whence it flows through the three layers of fibrous material, and through the openings in both the outer and inner cylinders after which, it flows upwardly into the head $a^4$ and out through the discharge valve $c^2$ and into the boiler.

In the construction shown the cylinder $e^3$ is movable both vertically and circumferentially by means of the spindle $f$ and the mechanism for moving the same. This operation, as will be understood, permits of the regulation of the size of the openings in the walls of said cylinders, by reason of the fact that when the spindle $f$ is turned, the inner cylinder is correspondingly turned circumferentially and the openings in said inner cylinder are thus turned away from those in the outer cylinder until said openings are of the desired size or closed entirely, and in the latter event the filter will remain inoperative. By moving the said inner cylinder vertically, the size of said openings may be regulated or their entire closure effected in the same manner.

As hereinbefore stated the openings in the lower part of the outer cylinder are made slightly larger than those in the upper portion thereof and are so disposed on said cylinder that when the inner cylinder is manipulated, all the apertures or openings will open simultaneously, but those in the said lower part will be of larger area; thus it will be seen that water will be admitted through the lower part of said cylinder more rapidly than through the upper part thereof. This is to allow for the more rapid clogging or filling up which invariably takes place when the apparatus is not in use, and as the precipitation of foreign matter is more liable to affect the closure of the apertures in the lower part of the filter first, it will be readily seen that this construction tends to equalize the inflow of water throughout the entire length of the cylinders.

The bushing $i$ is provided with a central longitudinal bore or passage, the lower portion of which is circular, and the upper portion rectangular in cross section; that portion of the spindle $f$ within the lower part of said bushing being threaded, and that portion thereof immediately above said threaded portion and extending to the top of the bushing being of the same shape as said upper part of said bushing and fitting tightly therein. That portion of the spindle $f$ extending from the top of said bushing $i$ is slightly turned down and provided with a thread on which the hand wheel $k$ is movable, and the extreme upper portion of said spindle above the hand wheel $k$ is turned down still more and is provided with indicator marks $k^2$ by means of which the vertical adjustment of the openings in the cylinders $e$ and $e^3$ may be easily and accurately adjusted. The collar portion $i^2$ of the bushing $i$ and one side of the cross head $j$ are also provided with similar indicating marks $j^3$, and by means of which the lateral adjustment of said openings may be determined in a similar manner, when it is desired to regulate the said openings by a circumferential movement of said spindle. As hereinbefore stated when it is desired to adjust said openings circumferentially, the nut $h$ is loosened as is also the nut $i^2$ and the bushing $i$ is turned by means of a wrench applied to the collar portion $i^2$ thereof, and by reason of the rectangular form of that part of the spindle $f$ extending through the upper rectangular portion of the bushing $i$, said spindle is moved together with the bushing until the desired opening has been made. The nuts $h$ and $i^3$ are then screwed tightly into position and this operation will secure the spindle $f$ against circumferential movement. When it is desired to adjust the openings vertically, the nut $h$ is loosened and the hand wheel $k$ tightened, this operation tending to raise said spindle, or this operation may be reversed and the nut $h$ tightened and the hand wheel $k$ loosened, in which event the spindle $f$ is moved downwardly, and as hereinbefore stated in either of these operations the size of the openings will show on the indicator placed on the extreme upper portion of said spindle.

If the openings should become clogged by an abnormal quantity of floating or suspended material carried by the feed water the safety valve n will operate and the filter may be cut out of operation by means of an ordinary by-pass valve until it has been cleaned. This operation of cleaning may be accomplished by opening the cleaning valve $p$ at the bottom of the body portion $a$ of the filter and introducing a jet of steam under high pressure, through the connection $o$ in the head $a^4$ of the filter, downwardly into the interior of the inner cylinder $e^3$, and by reason of the said pressure the steam will be forced through the openings in both of said cylinders, through the three layers of fibrous material and effectively removing therefrom all deposits and discharging the same out through the valve $p$ into the receiving hopper $q$, or a chemical reagent may be employed in place of the steam and the above result obtained in practically the same manner.

When starting the apparatus it is desirable that the pressure of water in the filter and shown on the gage $m$ shall be slightly in excess of the pressure of the boiler as this will insure that the apparatus is in proper working condition, and any increase in pressure shown on the gage $m$ will denote the clogging or obstruction of the openings of the cylinders $e$ and $e^3$ or the mesh of the fibrous layers $d$ of the filtering cartridge.

It will be understood, however, that changes in the construction hereinbefore described and modifications therein may be made, within the scope of the appended claims, without departing from the spirit of my invention or sacrificing its advantages.

Having fully described my invention, what I claim as new and desire to secure by Letters Patent, is:—

1. A filter of the class described comprising a body portion or casing provided at the bottom portion thereof with an inlet and at the top portion thereof with an outlet, a perforated tubular cylinder suspended in the top portion below the outlet, another perforated tubular cylinder supported in the first-named cylinder, a plurality of porous, fibrous casings inclosing the outer cylinder, and means for rotating the inner cylinder and moving it longitudinally.

2. A filter of the class described comprising a body portion or casing provided at the bottom portion thereof with an inlet and at the top portion thereof with an outlet, a perforated tubular cylinder suspended in the top portion below the outlet, another perforated tubular cylinder supported in the first-named cylinder, a plurality of porous, fibrous casings inclosing the outer cylinder, and means for rotating the inner cylinder and moving it longitudinally, the perforations in the outer cylinder decreasing in size from the bottom thereof upwardly.

3. In a filter of the class described, a stationary perforated tube, a movable perforated tube placed therein, a plurality of fibrous, fabric casings inclosing the stationary tube, and means for rotating the movable tube and moving it longitudinally.

4. In a filter of the class described, a stationary perforated tube, a movable perforated tube placed therein, a plurality of fibrous, fabric casings inclosing the stationary tube, and means for rotating the movable tube and moving it longitudinally, the perforations in the stationary tube decreasing in dimensions from the bottom thereof upwardly.

5. In a filter of the class described, a body portion having an inlet connected with the bottom part thereof and an outlet connected with the top part thereof, a stationary perforated tube suspended in the top part of said body portion below the outlet, a movable perforated tube placed in the stationary tube, a rod rigidly connected with the movable tube and passing out through the top of the top portion, and means for manipulating said rod to rotate the movable tube and move it longitudinally.

6. In a filter of the class described, a cylindrical body portion provided at the bottom thereof with a discharge valve below which is a discharge hopper, an inlet connected with the bottom part of the body portion, an outlet connected with the top part of the body portion, a stationary perforated tube suspended in the top part of the body portion below the outlet, a movable perforated tube placed in the stationary tube, a plurality of fibrous, fabric casings inclosing the stationary tube, and means for rotating the movable tube and moving it longitudinally.

7. In a filter of the class described, a cylindrical body portion provided at the bottom thereof with a discharge valve below which is a discharge hopper, an inlet connected with the bottom part of the body portion, an outlet connected with the top part of the body portion, a stationary perforated tube suspended in the top part of the body portion below the outlet, a movable perforated tube placed in the stationary tube, a plurality of fibrous, fabric casings inclosing the stationary tube, and means for rotating the movable tube and moving it longitudinally, the top part of the body portion being also provided with an inlet nozzle.

8. In a filter of the class described, a body portion, a stationary perforated tube suspended therein, a movable perforated tube placed in the stationary tube, a rod rigidly connected with the movable tube and passing out through the top of the body portion and by which the movable tube may be rotated and moved longitudinally, and means connected with the top of the body portion and with said rod whereby the extent of the movement of said tube in either direction may be regulated.

In testimony that I claim the foregoing as my invention I have signed my name in presence of the subscribing witnesses this 25th day of May, 1911.

WALTER PEMBERTON.

Witnesses:
ERNALD SIMPSON MOSELEY,
MALCOLM SMETHURST.